United States Patent [19]

Janey

[11] Patent Number: 4,622,215

[45] Date of Patent: Nov. 11, 1986

[54] PROCESS FOR PREPARING FINE GRAIN TITANIUM CARBIDE POWDER

[75] Inventor: Mark A. Janey, Concord, Tenn.

[73] Assignee: The United States of America as represented by the United States Department of Energy, Washington, D.C.

[21] Appl. No.: 710,881

[22] Filed: Mar. 12, 1985

[51] Int. Cl.$^4$ ............................................. C01B 31/30
[52] U.S. Cl. .................................... 423/440; 423/439; 427/215; 427/228; 501/87
[58] Field of Search ............... 423/439, 440; 427/215, 427/220; 501/87

[56] References Cited

U.S. PATENT DOCUMENTS

| | | | |
|---|---|---|---|
| 4,126,652 | 11/1978 | Oohara et al. | 423/440 |
| 4,536,358 | 8/1985 | Welsh | 264/81 |

FOREIGN PATENT DOCUMENTS

| | | | |
|---|---|---|---|
| 0021844 | 1/1981 | European Pat. Off. | 423/440 |
| 0107500 | 8/1979 | Japan | 423/440 |
| 0161430 | 9/1984 | Japan | 423/440 |
| 0162176 | 9/1984 | Japan | 423/440 |

*Primary Examiner*—John Doll
*Assistant Examiner*—Jackson Leeds
*Attorney, Agent, or Firm*—Earl L. Larcher; Stephen D. Hamel; Judson R. Hightower

[57] ABSTRACT

A method for preparing finely divided titanium carbide powder in which an organotitanate is reacted with a carbon precursor polymer to provide an admixture of the titanium and the polymer at a molecular-level due to a crosslinking reaction between the organotitanate and the polymer. The resulting gel is dried, pyrolyzed to drive off volatile components and provide carbon. The resulting solids are then heated at an elevated temperature to convert the titanium and carbon to high-purity titanium carbide powder in a submicron size range.

6 Claims, No Drawings

PROCESS FOR PREPARING FINE GRAIN TITANIUM CARBIDE POWDER

This invention was made as the result of work under Contract W-7405-ENG-26 between Union Carbide Corporation, Nuclear Division, and the United States Department of Energy.

BACKGROUND OF THE INVENTION

The present invention relates generally to the preparation of titanium carbide (TiC) powder, and more particularly to the method for preparing submicron sized TiC powder of high purity.

Ceramics and ceramic composites are receiving increased attention as structural materials for use in high-temperature environments especially those where erosion and corrosive conditions are present. For example, several different ceramics and ceramic compositions have been found to be satisfactory for use as a structural material for components used in high-temperature gas turbines and heat engines. Also, components used in coal conversion facilities can be satisfactorily manufactured from ceramic and ceramic composites.

Titanium carbide powder is ceramic material which is useful for the manufacture of cutting tools, grinding wheels and the like or can be combined with other ceramic systems such as aluminum oxide, silicon nitride and silicon carbide for the fabrication of structural components used in high temperature, erosive and/or corrosive applications as mentioned above.

Titanium carbide powder is presently produced primarily by the reduction of titanium dioxide by carbon powder, especially carbon black, at a temperature in the range of about 1700° to 2100° C. The titanium carbide powder is produced in a relatively wide size range greater than one micron due to grain growth and bonding together of the individual particulates by sintering during the reduction reaction. Further, undesirable inhomogeneities are frequently found in the powder due to diffusion gradients established during the reduction reaction.

SUMMARY OF THE INVENTION

It is the primary aim or object of the present invention to provide a method for synthesizing titanium carbide powder of high purity with discrete particulates of submicron size. The formation of the TiC powder is provided by the steps of forming a mixture of a liquid organotitanate or a organotitanate in solution and a solution containing a carbon precursor polymer with the organotitanate and the carbon precursor being in essentially stoichiometric concentrations with respect to titanium and carbon. The organotitanate provides a crosslinking reaction with the polymer for forming a gel. The gel is successively heated to dry the gel, drive volatile components from the gel and pyrolyze the polymer to provide free carbon. The remaining components of the gel namely, the titanium and carbon, are then heated to a temperature sufficient to convert the titanium and carbon to titanium carbide powder.

The use of the crosslinking organotitanate in the formation of the titanium carbide powder is particularly beneficial since it causes the occurence of molecular-level mixing of the titanium in the organotitanate and the carbon in the polymer to take place for forming titanium carbide powder of stoichiometric composition. Further, the powder exhibits high purity (greater than 99.99 percent pure) with little or no inhomogeneities due to the molecular-level mixing of the titanium and carbon provided by the components of the present method.

Other and further objects of the invention will be obvious upon a understanding of the illustrative method about to be described or will be indicated in the appended claims, and various advantages not referred to herein will occur to one skilled in the art upon employment of the invention in practice.

DETAILED DESCRIPTION OF THE INVENTION

As generally described above, the present invention is directed to a method for preparing high purity titanium carbide powder of grain size in the submicron range. The method is practiced by using high purity solutions to formulate and mix the titanium and carbon precursors. A liquid organotitanate or organotitanate solution is combined with a solution of a polymer essentially in stoichiometric amount with respect to titanium and carbon in the organotitanate and the polymer. The organotitanate provides a crosslinking agent for the carbon precursor polymers selected for use in the present invention with the organotitanate and the polymer forming a gelatinous precipitate which is indicative of the occurence of the crosslinking reaction. The crosslinking reaction assures that the molecular-level mixing of the titanium and carbon takes place and also causes the titanium reagent to be immobilized to prevent segregation durin subsequent drying and pyrolyzing of the crosslinked polymer. In some instances, as will be discussed below, the blending of the organotitanate with the carbon precursor polymer may require the addition of heat to effect the crosslinking reaction required for the formation of the gelatinous precipitate. Normally this heating is achieved at a temperature of about 80° to about 100° C. for a duration of about 1 to 24 hours.

The gelatinous precipitate is subjected to a relatively low temperature drying step to remove easily volatilized liquids from the mixture. This drying may be achieved by subjecting the precipitate to a temperature in the range of about 25° C. to about 100° C. for a duration of about 1 to 24 hours. As will be described below, in some instances there may be some excess liquid associated with the gel. This excess liquid may be readily decanted or otherwise removed prior to the drying step. Upon completion of the drying step the gel is heated in an inert atmosphere such as argon or the like to a temperature in the range of about 600° to 800° C. for pyrolyzing the polymer to provide free carbon while driving volatile components other than titanium and carbon from the gel. Usually, this temperature is maintained for a duration of about 10 to 120 minutes to effect the pyrolysis and assure the removal of essentially all the volatile material in the gel.

The dried and devolatilized components of the gel, namely, the crosslinked titanium and carbon, are heated to a temperature in the range of about 1200° to 1600° C. for a duration of about 1 to 2 hours in an inert atmosphere such as argon or the like for reacting the titanium and carbon to form highly pure titanium carbide powder. The titanium carbide powder so formed has a grain size of less than one micron in size.

The liquid organotitanates useful in the present invention include tetra isopropyl titanate, lactic acid titanium chelate, tetrabutyl titanate, acetylacetonate chelate, triethanolamine chelate and similar alleyl titanates and titanium chelates as marketed by E. I. DuPont de Nemours & Co., Wilmington, Del., under the trademark TYZOR and by others. The organotitanates listed herein are directed to those which provide a crosslinking agent for the carbon precursor polymer so as to ensure that the desired molecular-level mixing of the titanium and carbon will take place. Further, the cross linking immobilizes the titanium reagent to prevent seggregation during drying and pyrolyzing of the volatiles of the crosslinked polymer. The organotitanates described herein are preferable to other organotitanates such as isopropyl tri (N ethylamino-ethylamino) titanate or isopropyl tri (2-aminobenzoyl) titanate since the preferred organotitanates contain a larger concentration of titanium which provides for a more efficient formation of titanium carbide than the organotitanates containing lower concentrations of titanium. However, organotitanates with the lower concentrations of titanium can be used to form titanium carbide by practicing the present method. In such instances the reaction vessel containing the formed gelatinous precipitate will also include a considerable quantity of liquid which may be readily decanted from the reaction vessel prior to the drying step.

The carbon precursor polymers employed in the present invention have active hydrogens on a hydroxyl, amino, amido, carboxyl or thio group and include such polymers as polyvinyl alcohol, cellulose derivatives, phenolics, polyesters, polyvinyl acetates, epoxy resins and similar polymeric materials. The selected polymer should be one that provides a considerable percentage of free carbon for the conversion of the titanium to titanium carbide. The polymer is contacted with a relatively volatile solvent for sufficiently liquifying the polymer to provide intimate mixing with organotitanate. Such solvents include alcohols, water, esters, hydrocarbons, halogenated hydrocarbons and mixtures of the above.

In order to provide a more facile understanding of the present invention examples are set forth below in which organotitanates and carbon precursor polymers are converted to submicron titanium carbide powder.

EXAMPLE I

A mixture formed of 25 grams of tetra isopropyl titanate a product of E. I. DuPont de Nemours, Wilimington, Del., sold under the trademark TYZOR TPT, and 9.7 grams of a phenolic resin (Durez 31649, Occidental Chem. Co., Tonowanda, N.Y.) in 25 milliliters absolute ethanol was prepared and stirred. The formation of gelatinous precipitate during the stirring indicated that crosslinking reaction between the organotitanate and the polymer had occurred. The gel was dried at 60° for 16 hours and then heated under an argon atmosphere at temperature of 800° C. for 10 minutes to drive off volatiles and convert the polymer to carbon. The gel was then heated under argon for one hour to temperatures of 1400° C. and 1600° C. to react the titanium and carbon to produce fine TiC powder. Surface area measurements indicated the particle size of the powders was submicron, and x-ray diffraction results showed the powders to be pure TiC in both cases.

EXAMPLE II

A mixture composed of 50 grams of a lactic acid titanium chelate (TYZOR LA, E. I. DuPont de Nemours & Co., Wilmington, Del., CAS Reg. No. 65104-06-5) and 61.2 grams of methylcellulose (Methocel A, Dow Chemical Co., Midland, Mich.) in an aqueous solution was prepared and stirred for five minutes. No reaction was evident at room temperature, but on heating the mixture to 85° C. for 16 hours an irreversible gel formed in the vessel indicating that a crosslinking reaction occurred between the organotitanate and the methylcellulose. The gel was successively dried and the polymer pyrolyzed by gradually raising the temperature to 800° C. under an argon atmosphere and then maintaining the 800° C. for 10 minutes. The resulting nonvolatile solids were reacted at 1400° C. in argon for one hour to produce fine TiC powder.

It will be seen that the method of the present invention for synthesizing titanium carbide provides several important advantages over prior art processes. A critical aspect to the formation of the submicron sized powders of the present invention is the crosslinking reaction between the organotitanates and the polymers to provide the molecular-level mixing of the reactants. An important advantage of the present invention is that the maximum temperature of 1400° to 1600° C. utilized for the reaction between the crosslinked carbon and the titanium for forming the titanium carbide is considerably lower than the prior art processes which require a carburizing temperature of about 1700° to 2000° C. so as to render the subject process more energy efficient and cost effective.

While the present invention is directed to synthesizing titanium carbide to form a powder which may be utilized as a dispersion in a matrix of some other ceramic system such as silicon carbide or aluminum oxide it will appear clear that matrix material such as silicon carbide or aluminum oxide could be admixed in powder form in the reaction solution of the carbon precursor and the organotitanate. The gel mixture would then contain the particulate matrix material as well as the crosslinked titanium and polymer so that upon heating to effect the formation of the titanium carbide a fine coating of the titanium carbide forms upon the ceramic matrix particles. This fine TiC-coated powder then could be densified into a suitable configuration by sintering or employing hot-pressing techniques as well known in powder metallurgical practices.

I claim:

1. A method for preparing titanium carbide powder of a purity greater than 99.9% in a submicron particle size range, comprising the steps of forming a mixture consisting essentially of a liquid organotitanate or an organotitanate in a solution and a solution of a carbon precursor polymer with the organotitanate and the carbon precursor polymer being in essentially stoichiometric concentrations with respect to titanium and carbon and with the organotitanate providing a crosslinking reaction with the carbon precursor polymer for forming a gel, heating the gel to successively dry the gel, drive volatile components from the gel and pyrolyze the polymer to form free carbon, and thereafter heating the remaining components of the gel to a temperature sufficient to convert the titanium and carbon to titanium carbide powder.

2. The method claimed in claim 1, wherein the organotitanate is selected from the group consisting of tetra isopropyl titanate, lactic acid chelate, tetrabutyl titanate, acetylacetonate chelate and triethanolamine chelate.

3. The method claimed in claim 1, wherein the carbon precursor polymer is selected from the group of polymers having active hydrogens on a hydroxyl, amino, amido, carboxyl or thio group.

4. The method claimed in claim 2 wherein the carbon precursor polymer is methylcellulose or phenolic resin.

5. The method claimed in claim 1, wherein the temperature sufficient to convert the titanium and carbon to titanium carbide is in the range of 1400° to 1600° C. for a duration of about one to two hours.

6. The method claimed in claim 1, including the additional step of heating the mixture to a temperature sufficient to effect the crosslinking reaction between the organotitanate and the carbon precursor polymer for forming the gel.

* * * * *

UNITED STATES PATENT AND TRADEMARK OFFICE
CERTIFICATE OF CORRECTION

PATENT NO. : 4,622,215

DATED : November 11, 1986

INVENTOR(S) : Mark A. Janney

It is certified that error appears in the above-identified patent and that said Letters Patent is hereby corrected as shown below:

On the Title Page, Items [19] and [75]  "Janey" should read
-- Janney --.

Signed and Sealed this

Twenty-ninth Day of November, 1988

Attest:

DONALD J. QUIGG

*Attesting Officer*  *Commissioner of Patents and Trademarks*